Nov. 20, 1951     S. E. VINGERLING     2,576,054

MACHINE FOR FILLING MOLDS WITH LIQUID CHOCOLATE

Filed Dec. 22, 1948     2 SHEETS—SHEET 1

INVENTOR.
S. E. Vingerling

Nov. 20, 1951 S. E. VINGERLING 2,576,054
MACHINE FOR FILLING MOLDS WITH LIQUID CHOCOLATE
Filed Dec. 22, 1948 2 SHEETS—SHEET 2
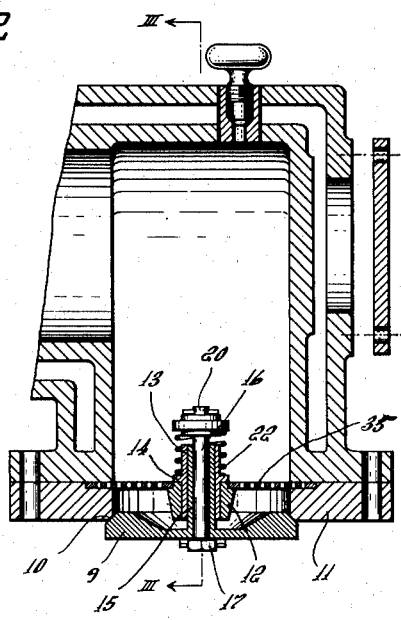
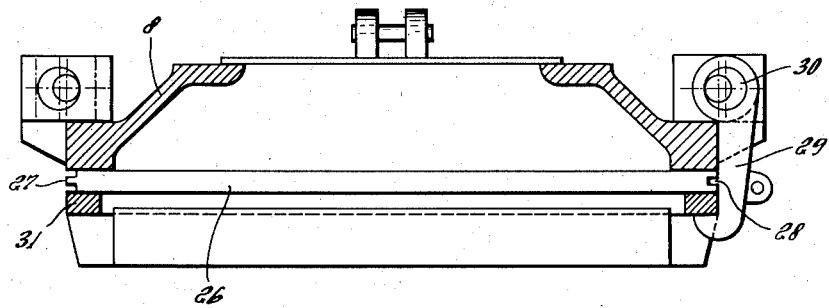
INVENTOR.
Samuel Everhardus Vingerling
BY
Wendwatt, Lind & Ponack
Attorneys Patented Nov. 20, 1951

2,576,054

UNITED STATES PATENT OFFICE 2,576,054

MACHINE FOR FILLING MOLDS WITH LIQUID CHOCOLATE

Samuel Everhardus Vingerling, Rotterdam, Netherlands, assignor to Vingerling's Machinefabriek N. V., Rotterdam, Netherlands, a corporation of the Netherlands Application December 22, 1948, Serial No. 66,732

3 Claims. (Cl. 107—28)

1

The invention relates to a machine for the filling of molds with liquid chocolate or similar filling material, comprising a container from which the material, by means of a distributing device, is forced under pressure to a hollow mouth piece. Machines of this type are known.

In mold filling machines of this type work interruptions occur periodically due to the liquid chocolate at the outer side of the mouth piece being cooled more than in the center due to the surrounding atmosphere. For proper progress of the filling process it is necessary that the temperature of the liquid chocolate be kept as accurately and uniformly as possible at about 30° C., since deviations therefrom may give rise to formation of granules, which should be avoided.

An object of the present invention is to remove this drawback.

A further object is to provide for a uniform flow of liquid chocolate through the mouthpiece.

The existing mold filling machines have the further drawback, that the replacement of the spout plate is time consuming, whereby the production of the machine is reduced. Replacement is often necessary in connection with a change to the production of chocolate articles of different shape.

This drawback is also overcome by the present invention.

Further objects and features will be apparent from the following detailed description taken together with the accompanying drawings in which:

Figure 2 is a partial cross-sectional view on a larger scale, of a distributing cylinder with valve means according to the invention;

Figure 4 is a longitudinal section of a mouth piece with a stationary guide plate according to the invention.

Figure 1:
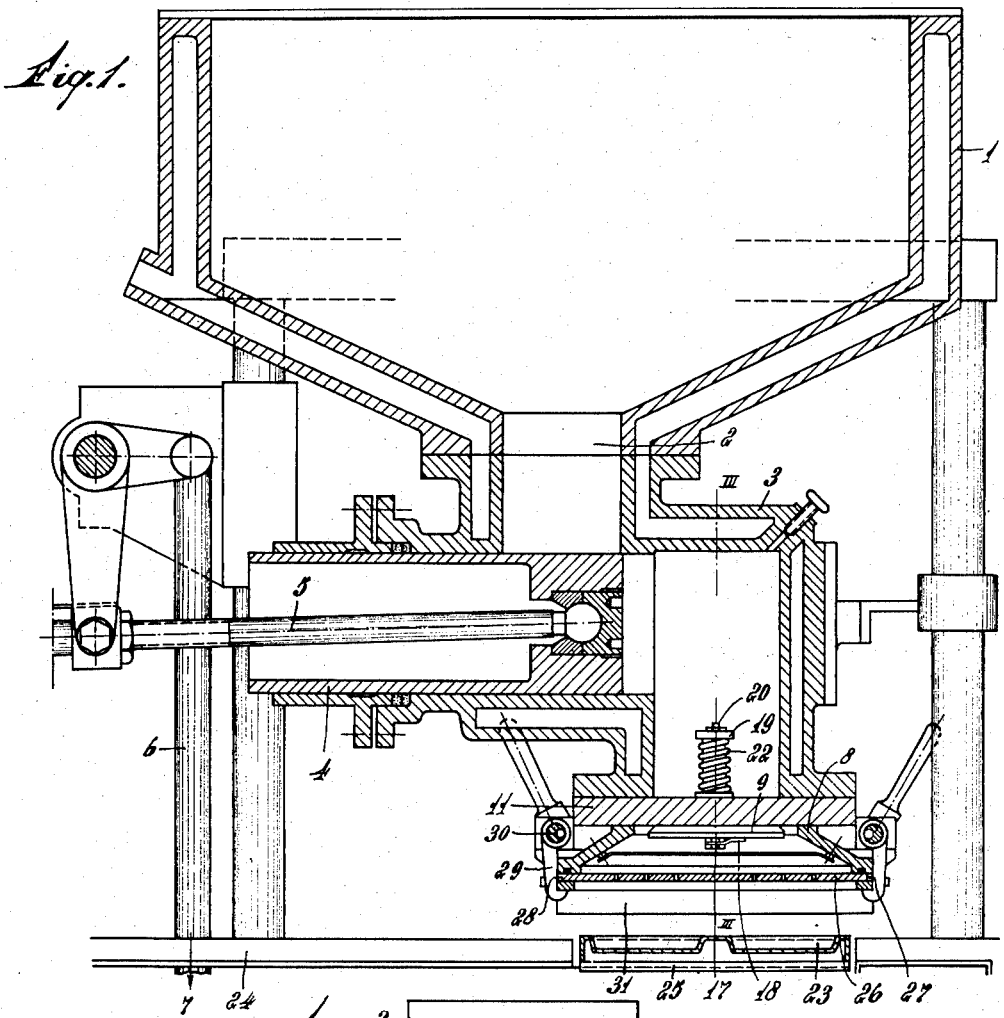
Figure 1 is a partial vertical sectional view of a mold filling machine of the present type.

As shown in Figure 1 the mold filling machine is provided with a double walled container 1 for the filling mass, for example, liquid chocolate, which from the bottom of the container, at 2, flows into a distributing cylinder 3 with a pressure plunger 4 mounted therein for reciprocation. The rod 5 of plunger 4 is coupled to an operating mechanism of which a rod 6 is shown in operative connection with rod 5 and is driven by a source of power as represented by an arrow at 7. This mechanism is not described in detail since well known and since not essential to the invention proper.

From the distributing cylinder 3 the liquid chocolate flows along a valve means to be described hereinafter into a hollow outlet mouth piece 8, the details of which appear in Figure 4.

2

The distributing cylinder 3, the outlet opening of which has an oblong shape, is also provided with a double wall which, as in the container 1, serves for the circulation of a heating medium. At the bottom the distributing cylinder 3 is open and the mouth is closed by two valves 9, 9, each bearing against a valve seat 10 on a common valve seat carrying plate 11, secured to the lower end of the distributing cylinder. Above each valve 9 a perforated plate or sieve 35 is mounted in the seat plate 11.

Through a tubular portion 12 associated with the seat plate, one for each valve, a sleeve 13 extends, provided with an external collar 14 bearing on the portion 12. A hollow valve stem 15 snugly fitting in the sleeve 13 receives a set bolt 16 having a fixed head 17 with a lock plate 18; the screw threaded upper end of the set bolt is screwed into a nut 19, into which two pins 20, 20, are screwed, engaging holes in a connecting strip 21, extending to the set bolt of the second valve and connected to the latter in a similar manner. Between each collar 14 of a sleeve and the corresponding nut 19 a helical pressure spring 22 is mounted, by means of which the valve 9 may be kept pressed on its seat 10.

The tension of the springs is chosen so that each valve may be opened against the spring tension under the pressure acting on the mass of chocolate. This pressure is produced at any time when the plunger performs its compressing stroke. As appears from Figure 1, the mouth piece 8 is located above a mold 23 to be filled, a plurality of which are arranged in a row upon a conveyor 24.

Below the mouth piece each mold may be moved upwards to the required small distance from the mouth piece by means of a lifting device 25.

The various motions are timed. After a mold has been positioned under the mouth piece, then, after the opening of the valves, the chocolate mass will flow through between the circumference of said valves and the seats 10 and will be distributed, at least in part, from the outer side inwardly over the spout plate 26, whereupon it is forced through perforations in the spout plate into the recesses of the mold.

At the plate, where the passage between the valves and the seats is not heated by a heating medium in the jacket the hot chocolate mass prevents the wall of the mouth piece from being too greatly cooled.

In Figure 4 the mouth piece 8 is shown to a larger scale. This mouth piece is adapted to be mounted underneath the valves 9, 9 in Figures 2 and 3 against the seat plate 11.

The spout plate 26 in Figure 4 is at the left provided with a rib 27 and at the right with a corresponding groove 28; the perforations in this plate, which may be made e. g. of aluminum, are adapted to the figures in the chocolate mold. These figures often differ and therefore the spout plate has to be replaced often. This has been simplified by said rib and groove and an attachment device comprising jaws 29, one at either side, and an eccentric pressure exerting device 30 for the clamping of a frame 31 to the lower side of the spout plate 26.

If a different spout plate 26, i. e. a plate having different perforations, is to be mounted in the mouth piece, then the jaws 29 are released so that the strong clamping action is removed but the spout plate 26 nevertheless is kept in engagement with the mouth piece, whereupon a rib of the new spout plate to be used is first inserted into the groove of the spout plate to be removed and the latter by means of the new plate is pushed aside; the mouth piece thus remains closed at the lower side. When the new spout piece has been placed in position, then the jaws are firmly fixed in the clamping position.

Figure 3:
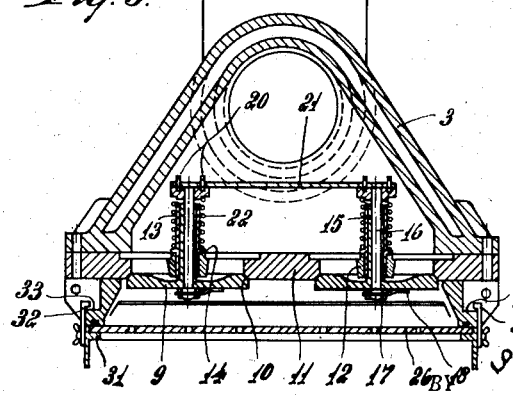
Figure 3 is a longitudinal section on the line III—III in Fig. 1.

In the lower portion of Figure 3 means have been shown preventing the spout plate 26 from falling down after the hook-shaped jaws 29 have been moved into the inoperative non-clamping position. To this end hooks 32 are secured to the frame 31, said hooks when the jaws occupy the clamping position, being located at a small distance above the adjacent horizontal portions 33 of the mouth piece 8. Now, if the spout plate is to be replaced by another one (by a shifting movement) then first the jaws 29 are loosened, whereupon the spout plate drops until the hooks 32 bear upon the portions 33 of the mouth piece.

A pump or the like can be provided by means of which the heating medium can be circulated through the jacket of the container 1 and of the distributing device but is not illustrated since not essential to a complete understanding of the invention and any suitable known type can be used.

I claim:

1. A machine for filling molds with liquid chocolate and the like comprising a container for the material, said container having a discharge opening therein, a distributing device connected with said discharge opening, a hollow mouth piece in open communication with said distributing device, a replaceable spout plate closing the open end of said mouth piece, guide means for said distributing device, said guide means comprising a common valve seat plate secured to the discharge end of said distributing device and interposed therebetween and said hollow mouth piece, a plurality of valves spaced from one another and adapted for seating on said common seat plate, separate spring means biasing each said valve to closed position, each said valve being adapted to be lifted from a seated position on said seat plate against the biasing spring action by spout pressure, said spout plate being arranged beneath all said valves.

2. A machine as claimed in claim 1 and wherein each said valve comprising a hollow stem, a set bolt inserted through said hollow stem, a sleeve bearing surrounding each said hollow stem, a tubular member for each said valve in said common valve seat plate, said sleeve bearings being inserted in and carried by said tubular members, said spring means comprising a helical spring, said tubular member having an external collar thereon, a nut on an end of said set bolt projecting from said hollow stem, said helical spring being inserted between said external collar and said nut.

3. A machine as claimed in claim 2 and wherein said spout plate is regular in shape and is provided at two opposite edges thereof with a groove and a corresponding rib respectively, guide means slidably supporting said spout plate, and means for detachably connecting said plate to said mouth piece.

SAMUEL EVERHARDUS VINGERLING.

REFERENCES CITED

The following references are of record in the file of this patent:

UNITED STATES PATENTS

| Number | Name | Date |
|---|---|---|
| 1,651,242 | Baker | Nov. 29, 1927 |
| 1,850,723 | Kolliker | Mar. 22, 1932 |
| 1,875,691 | Helland | Sept. 6, 1932 |
| 2,121,065 | Anderson | June 21, 1938 |